US009619920B2

(12) United States Patent
Howell

(10) Patent No.: US 9,619,920 B2
(45) Date of Patent: Apr. 11, 2017

(54) METHOD AND SYSTEM FOR EFFICIENT MODELING OF SPECULAR REFLECTION

(71) Applicant: Dirtt Environmental Solutions, Ltd., Calgary (CA)

(72) Inventor: Joseph S. Howell, Uintah, UT (US)

(73) Assignee: ICE EDGE Business Solutions, LTD., Calgary (CA)

( * ) Notice: Subject to any disclaimer, the term of this patent is extended or adjusted under 35 U.S.C. 154(b) by 0 days.

(21) Appl. No.: 14/110,910

(22) PCT Filed: Jan. 31, 2013

(86) PCT No.: PCT/US2013/024009
§ 371 (c)(1),
(2) Date: Oct. 9, 2013

(87) PCT Pub. No.: WO2014/120174
PCT Pub. Date: Aug. 7, 2014

(65) Prior Publication Data
US 2015/0325035 A1 Nov. 12, 2015

(51) Int. Cl.
*G06T 15/06* (2011.01)
*G06T 15/50* (2011.01)
*G06T 15/80* (2011.01)

(52) U.S. Cl.
CPC .............. *G06T 15/06* (2013.01); *G06T 15/50* (2013.01); *G06T 15/80* (2013.01); *G06T 2215/12* (2013.01)

(58) Field of Classification Search
CPC ...... G06T 15/06; G06T 15/80; G06T 2215/12
See application file for complete search history.

(56) References Cited

U.S. PATENT DOCUMENTS 3,972,163 A    8/1976    Coperthwaite
4,207,714 A    6/1980    Mehls
(Continued)

FOREIGN PATENT DOCUMENTS

EP    1066579    1/2002
EP    2207140    7/2010
(Continued)

OTHER PUBLICATIONS

BeLight, Live Interior 3D Pro User's Manual, 2010.*
(Continued)

*Primary Examiner* — Jacinta M Crawford
*Assistant Examiner* — Phuc Doan
(74) *Attorney, Agent, or Firm* — Workman Nydegger

(57) ABSTRACT

Systems, methods, and apparatus allow for the real-time rendering of specular effects within a three-dimensional model. At least one implementation allows a user to create a map that comprises a representation of at least one light source within a three-dimensional model. Furthermore, at least one implementation casts a viewpoint ray to an object surface point, wherein the viewpoint ray comprises a ray extending from a user perspective within the three-dimensional model. Additionally, at least one implementation casts a reflection ray of the viewpoint ray. Further, at least one implementation identifies an intersection point between the reflection ray and the map. Still further, at least one implementation calculates the specular reflection of the object surface point based on the intersection point.

16 Claims, 10 Drawing Sheets

(56) References Cited

U.S. PATENT DOCUMENTS

| | | | |
|---|---|---|---|
| 4,705,401 A | 11/1987 | Addleman | |
| 5,255,207 A | 10/1993 | Cornwell | |
| 5,625,827 A | 4/1997 | Krause | |
| 5,673,374 A * | 9/1997 | Sakaibara | G06T 15/506 345/426 |
| 5,801,958 A | 9/1998 | Dangelo | |
| 5,870,771 A | 2/1999 | Oberg | |
| 6,078,332 A | 6/2000 | Ohazama | |
| 6,097,394 A | 8/2000 | Levoy | |
| 6,268,863 B1 | 7/2001 | Rioux | |
| 6,292,810 B1 | 9/2001 | Richards | |
| 6,493,679 B1 | 12/2002 | Rappaport | |
| 6,580,426 B1 | 6/2003 | Small | |
| 6,629,065 B1 | 9/2003 | Gadhi | |
| 6,900,841 B1 | 5/2005 | Mihara | |
| 6,971,063 B1 | 11/2005 | Rappaport | |
| 7,019,753 B2 | 3/2006 | Rappaport | |
| 7,062,454 B1 | 6/2006 | Giannini | |
| 7,085,697 B1 | 8/2006 | Rappaport | |
| 7,096,173 B1 | 8/2006 | Rappaport | |
| 7,099,803 B1 | 8/2006 | Rappoport | |
| 7,155,228 B2 | 12/2006 | Rappaport | |
| 7,171,208 B2 | 1/2007 | Rappaport | |
| 7,216,092 B1 | 5/2007 | Weber | |
| 7,243,054 B2 | 7/2007 | Rappapor | |
| 7,246,045 B1 | 7/2007 | Rappaport | |
| 7,299,168 B2 | 11/2007 | Rappaport | |
| 7,299,416 B2 | 11/2007 | Jaeger | |
| 7,623,137 B1 | 11/2009 | Miller | |
| 7,817,823 B1 * | 10/2010 | O'Donnell | G06T 15/60 345/426 |
| 7,825,937 B1 | 11/2010 | Sakhartchouck | |
| 8,255,338 B1 | 8/2012 | Brittan | |
| 8,271,336 B2 | 9/2012 | Mikurak | |
| 8,276,088 B2 | 9/2012 | Ke | |
| 8,285,707 B2 | 10/2012 | Day | |
| 8,290,849 B2 | 10/2012 | Eisler | |
| 8,301,527 B2 | 10/2012 | Tarbox | |
| 8,332,401 B2 | 12/2012 | Hull | |
| 8,332,827 B2 | 12/2012 | Edde | |
| 8,335,789 B2 | 12/2012 | Hull | |
| 8,386,918 B2 | 2/2013 | Do | |
| 8,402,473 B1 | 3/2013 | Becker | |
| 8,423,391 B2 | 4/2013 | Hessedenz | |
| 8,442,850 B2 | 5/2013 | Schorr | |
| 8,510,382 B2 | 8/2013 | Purdy | |
| 8,521,737 B2 | 8/2013 | Hart | |
| 8,566,419 B2 | 10/2013 | Purdy et al. | |
| 8,600,989 B2 | 12/2013 | Hull | |
| 8,626,877 B2 | 1/2014 | Greene | |
| 8,645,973 B2 | 2/2014 | Bosworth | |
| 8,650,179 B2 | 2/2014 | Driesch | |
| 8,773,433 B1 * | 7/2014 | Smyrl | G06T 15/506 345/426 |
| 2001/0044707 A1 | 11/2001 | Gavin et al. | |
| 2003/0011596 A1 * | 1/2003 | Zhang | G06T 15/506 345/426 |
| 2004/0027371 A1 | 2/2004 | Jaeger | |
| 2004/0075655 A1 | 4/2004 | Dunnett | |
| 2004/0100465 A1 | 5/2004 | Stowe | |
| 2004/0174358 A1 | 9/2004 | Takagi | |
| 2005/0044133 A1 | 2/2005 | Hashimoto | |
| 2005/0072059 A1 | 4/2005 | Hodsdon | |
| 2005/0104883 A1 | 5/2005 | Snyder | |
| 2006/0274064 A1 | 12/2006 | Dougherty | |
| 2007/0098290 A1 | 5/2007 | Wells | |
| 2007/0109310 A1 | 5/2007 | Xu | |
| 2007/0276791 A1 | 11/2007 | Fejes | |
| 2009/0128558 A1 | 5/2009 | Morello | |
| 2009/0145075 A1 | 6/2009 | Oakley | |
| 2009/0187389 A1 | 7/2009 | Dobbins | |
| 2010/0018141 A1 | 1/2010 | Kelly | |
| 2010/0036520 A1 | 2/2010 | Barbir | |
| 2010/0268513 A1 | 10/2010 | Loberg | |
| 2011/0054652 A1 | 3/2011 | Heil | |
| 2011/0227922 A1 | 9/2011 | Shim | |
| 2011/0227924 A1 | 9/2011 | Nakajima | |
| 2011/0265405 A1 | 11/2011 | Ksenych | |
| 2012/0288184 A1 | 11/2012 | Zomet | |
| 2014/0095122 A1 | 4/2014 | Appleman | |
| 2014/0176530 A1 | 6/2014 | Pathre | |

FOREIGN PATENT DOCUMENTS

| | | |
|---|---|---|
| JP | 02039377 | 2/1990 |
| JP | 2000132706 | 5/2000 |
| JP | 2007264707 | 10/2007 |
| WO | 02059545 | 8/2002 |
| WO | 2007138560 | 12/2007 |
| WO | 2009111885 | 9/2009 |
| WO | 2013040016 | 3/2012 |
| WO | 2012162442 | 11/2012 |
| WO | 2012173741 | 12/2012 |

OTHER PUBLICATIONS

Whitted, An Improved Illumination Model for Shaded Display, Jun. 1980, Communications of the ACM, vol. 23 No. 6.*

Chuang, Efficient Image-Based Methods for Rendering Soft Shadows, 2006, URL: http://www.csie.ntu.edu.tw/~cyy/courses/rendering/06fall/lectures/handouts/lec15_sshadow1.pdf.*

Wiki, List of color spaces and their uses, 2012, URL: https://en.wikipedia.org/w/index.php?title=List_of_color_spaces_and_their_uses&oldid=507999322.*

Pov-Wiki, Light Source—Spotlights, 2012, URL: http://wiki.povray.org/content/Reference:Light_Source#Spotlights.*

Hara, Light Source Position and Reflectance Estimation from a Single View without the Distant Illumination Assumption, 2005, IEEE Transactions on Pattern Analysis and Machine Intelligence, vol. 27, No. 4.*

Curless, Ray Tracing URL: http://courses.cs.washington.edu/courses/cse557/09au/lectures/ray-tracing.pdf, Washington University, CSE 557 Fall 2009. pp. 1-40.*

International Search Report and Opinion, PCT/US2013/045047, mailed Mar. 3, 2014.

International Search Report and Opinion, PCT/US2013/043735, mailed Feb. 27, 2014.

International Search Report and Opinion, PCT/US2013/050764, mailed Feb. 27, 2014.

International Search Report and Written Opinion for PCT/US2013/024063 mailed Oct. 25, 2013.

International Search Report and written opinion for PCT/US2013/023198 mailed Oct. 18, 2013.

Ram Schacked et al.: "Automatic Lighting Design Using a Perceptual Quality Metric"; 2001; Eurographic 2011 vol. 20 (2001); p. 1-12.

Ravi Mamoorthi et al., "A First-Order Analysis of Lighting, Shading, and Shadows," ACM Transactions on Graphics, vol. 26, No. 1, Article 2, Jan. 31, 2007. See p. 2, 8, and 12-15.

ERCO, "ERCO Guide," http://www.erco.com/download/ data/30_media/_guide_pdf/ 120_en/_erco_guide_7_simulation.pdf, May 12, 2006. See p. 376, 389-388, 399, and 427.

Joseph Zupko et al., "System for Automated Interactive Lighting (SAIL)," In: Proceedings for the 4th International Conference on Foundations of Digital Games, 2009, pp. 223-230. See pp. 223-226.

Maxwell Render, "Maxwell Render 2.5 User Manual," http://www.architektur.uni-kl.de/digitalewrkzeuge/ss13/digitalewerkzeuge/maxwel-english.pdf, Dec. 31, 2010. See p. 22-25, 36-37, and 48-49.

Jeremy Birn, "Digital Lighting and Rendering," Pearson Education, 2nd ed., 2006, ISBN 0132798212. See p. 35-59.

Pierre-Felix Breton, "Autodesk Revit and 3ds Max Design for Lighting and Daylighting simulation," http://www.pfbreton.com/wordpress/wp-content/uploads/2012/05/L12L07%20Handout.pdf, May 7, 2012. See pp. 28, 51-52, and 87-103.

David Cohn, "Photorealistic Rendering Techniques in AutoCAD3D," Autodesk University 2009, http://www.dscohn.com/

(56) References Cited

OTHER PUBLICATIONS

AU/handouts/AU214-2%20-%20Photorealistic%20Rendering%20Techniques%20in%20AutoCAD%203D.pdf, Dec. 31, 2009. See pp. 4-6.
International Search Report and Written Opinion for PCT/US2012/068805 mailed Aug. 29, 2013.
CG Blog; "Photoshop tutorial and post-production glasses"; Retrieved online from; www.grafica3dblog.it/photoshop_tutorial_glass.htm; pp. 1-7.
International Search Report and Written Opinion for PCT/US2013/024009 mailed Oct. 25, 2013.
Non-Final Office action for U.S. Appl. No. 14/113,260 mailed Sep. 14, 2015.
Non-Final Office action for U.S. Appl. No. 14/348,879 maield on Sep. 22, 2015.
International Search Report and Opinion, PCT/US2015/011105, mailed May 5, 2015.
Final Office Action for U.S. Appl. No. 14/348,879 mailed Feb. 22, 2016.
Notice of Allowance for U.S. Appl. No. 14/113,260 mailed Mar. 23, 2016.
European Search Report for application No. EP 13/872,502 mailed on Aug. 17, 2016.
Michael Kass: "Interactive Depth of Field Using Simulated Diffusion on a GPU", 2006, pp. 1-8, XP002760859, Retrieved from the Internet: URL: http://graphics.pixar.com/library/DepthOfField/paper.pdf [retrieved on Aug. 17, 2016].
Shaan Hurley: "Learn to Walk and Fly in AutoCAD", Jan. 23, 2009 (Jan. 23, 2000), pp. 1-7, XP002760860, Retrieved from the Internet: URL: http://autodesk.blogs.com/between_the_lines/2009/01/learn-to-walk-and-fly-in-autocad.html [retrieved on Aug. 17, 2016].
Nousch M et al: "CAD on the World Wide Web: virtual assembly of furniture with BEAVER", Proceedings/VRML 99, Fourth Symposium on the Virtual Reality Modeling Language, Paperborn Germany, Feb. 23-26, 1999, ACM New York, NY, USA, Feb. 23, 1999 (Feb. 23, 1999), pp. 113-119, XP002172203, DOI: 10.1145/299246.299283 ISBN: 978-1-58113-079-9.
Jean-Eudes Marvie et al: "The FL-system: a functional L-system for procedural geometric modeling", The Visual Computer; International Journal of Computer Graphics, Springer, Berlin, DE, vol. 21, No. 5, Jun. 1, 2005 (Jun. 1, 2005), pp. 329-339, XP019339112, ISSN:1432-8726, DOI: 10.1007/S00371-005-0289-Z.
Supplementary European Search Report for application No. EP13885841 mailed on Sep. 30, 2016.
John Chapman: "john-chapman.net—Deferred Rendering, Transparency & Alpha Blending", Aug. 1, 2011 (Aug. 1, 2011), pp. 1-7, XP0552959287, Retrieved from the Internet: URL:http://www.john-chapman.net/content.php?d=13 [retrieved on Aug. 17, 2016].
Anonymous: OpenGL FAQ / 15 Transparency, Translucency, and Using Blending. Dec. 30, 1999 (Dec. 30, 1999), XP055273530, Retrieved from the Internet: URL: http://www.opengl.org/archives/resources/faq/technical/transparency.htm [retrieved on May 19, 2016].
Supplementary European Search Report for application No. EP13/873,685 mailed on Sep. 7, 2016.
Non-Final Office Action for U.S. Appl. No. 14/117,844 mailed on Sep. 29, 2016.

* cited by examiner

METHOD AND SYSTEM FOR EFFICIENT MODELING OF SPECULAR REFLECTION

CROSS-REFERENCE TO RELATED APPLICATIONS

The present invention is a 35 U.S.C. §371 U.S. National Stage of PCT Application No. PCT/US2013/024009 filed Jan. 31, 2013, entitled "Method and System for Efficient Modeling of Specular Reflection," the entire content of which is incorporated by reference herein.

BACKGROUND OF THE INVENTION

1. The Field of the Invention

The present invention relates generally to computer-generated graphics, and more specifically relates to modeling and rendering specular reflection of light.

2. Background and Relevant Art

As computerized systems have increased in popularity so have the range of applications that incorporate computational technology. Computational technology now extends across a broad range of applications, including a wide range of productivity and entertainment software. Indeed, computational technology and related software can now be found in a wide range of generic applications that are suited for many environments, as well as fairly industry-specific software.

One such industry that has employed specific types of software and other computational technology increasingly over the past few years is that related to building and/or architectural design. In particular, architects and interior designers ("or designers") use a wide range of computer-aided design (CAD) software for designing the aesthetic as well as functional aspects of a given residential or commercial space. For example, a designer might use a CAD program to design the interior layout of an office building. The designer might then render the layout to create a three-dimensional model of the interior of the office building that can be displayed to a client.

While three-dimensional rendering is becoming a more common feature in CAD programs, three-dimensional rendering is a fairly resource intensive process. For example, a traditional rendering program can take anywhere from several minutes to several hours to appropriately render all of the lighting and shading effects of a given space with accuracy. This may be particularly inconvenient to a designer who has to wait for the scene to render after making a change to the layout of the scene. Alternatively, some rendering programs may use methods of rendering that result in less realistic images to speed up the rendering and use fewer resources. Such programs may do so by, for example, rendering fewer features within the scene or by using pre-rendered elements that do not necessarily correspond with the actual scene being rendered.

One such lighting effect that can require intensive resources to properly incorporate into a three-dimensional model is specular reflections. Specular reflection of light occurs when light hits a surface that reflects the light in a relatively narrow range of directions, forming the appearance of shiny spots on an object. Proper rendering of specular reflection can contribute significantly to the realism of a three-dimensional model.

Many conventional methods of calculating specular reflection have various disadvantages. For instance, when multiple light sources are present in a scene, many conventional methods calculate specular reflection for each individual light and combine the effect of the individual lights. For multiple lights, the computation load can increase linearly with additional lights. Because the number of lights is typically large in certain settings, such as in offices and department stores, rendering can slow down (many-fold) in these applications.

A second limitation with conventional methods lies in the algorithm used to calculate specular reflection. Some conventional methods model the specular reflection value for each individual light based on the equation $S_i = I_i k_s (R_i \cdot V_i)^n$. In this equation, $I_i$ is the intensity of light source i, $k_s$ is a specular reflection constant, and $R \cdot V$ is the dot product of reflection vector R and viewing vector V shown in FIG. 1. The parameter n is a variable reflecting the smoothness of a surface. Because the incidence angle $\alpha$ between the incident light vector L and the normal vector N equals the reflection angle $\alpha$ between R and N, R can be computed as $R = 2(L \cdot N) N - L$. These conventional methods require calculation of not only the viewing vector V, but also the reflection vector R, which often changes at different points of a surface. The calculation of the reflection vector R adds to the computational burden for the simulation of specular reflection.

An additional problem exists in conventional methods using the foregoing algorithm. These conventional methods can require calculating the dot product of reflection ray vector R and viewing vector V, or the cosine value of the viewing angle, $\cos(\beta)$. These methods then can typically raise the value to the power of 200 or higher to simulate the appearance of shiny surfaces. These methods need to repeat the same calculation for each point on an object's surface, and for every viewing perspective in a dynamic viewing situation. These methods can substantially increase the computational load and slow down simulation of the object in dynamic scenes.

The foregoing problems make many of the conventional methods too slow to be practical in real-time rendering of dynamic scenes, such as in a virtual walk-through of a three-dimensional architectural model, video games, or other virtual environments. Computer generated graphics for these settings typically require rendering rate of 30 frames per second or higher to achieve smooth motion and realistic appearance.

One method intended to circumvent the foregoing problems is the "baking" method. The baking method involves pre-calculating the specular reflection of an object in a particular setting, usually with a fixed lighting condition. The convention software then applies the same reflection of the object to different frames of a video for a dynamic scene, regardless of the changes of the incident vector L, reflection vector R, or the viewing vector V. Although this method is computationally simpler than conventional methods that calculate specular reflection for each frame, the realism of a rendered object is substantially inferior when object placement and the viewing angle deviate from the original setting.

Some conventional methods used in video games utilize "ambient occlusion" techniques to improve realism. The results, however, are not realistic due to the use of a single, global ambient light source, and conventional design spaces tend to incorporate a plurality of light sources. In addition, ambient occlusion techniques typically do not allow for dynamic differential of lighting in different areas of the layout or scene, due to the single, global light source nature. Ambient occlusion techniques usually have no ability (or are significantly limited) to turn off lighting in one area of the scene, and turn on lighting in another area.

Accordingly, there are several disadvantages in the art that can be addressed.

BRIEF SUMMARY OF THE INVENTION

Implementations of the present invention overcome one or more of the foregoing or other problems in the art with systems, methods, and apparatus configured to allow efficient rendering of realistic specular reflection of objects in a design software application. In particular, one or more implementations of the present invention allow for simulation of specular reflection without having to perform a separate calculation for each light in an environment with multiple lights. In addition, one or more implementations of the present invention have the ability to model specular reflection with sufficient realism while turning off lighting in one area of the scene, and while turning on lighting in another area. In general, one or more implementations of the invention provide fast and realistic simulation of specular reflection, allowing real-time rendering of videos and dynamic scenes in applications such as virtual walkthroughs of interior design spaces, video games, and other virtual environments.

For example, a method in accordance with one or more implementations of rendering a specular effect within a three-dimensional model can include creating a map that comprises a representation of at least one light source within a three-dimensional model. The method can also include casting a viewpoint ray to an object surface point. In such a case, the viewpoint ray comprises a ray extending from a user perspective within the three-dimensional model. In addition, the method can include casting a reflection ray of the viewpoint ray. Furthermore, the method can include identifying an intersection point between the reflection ray and the map. Still further, the method can include calculating the specular reflection of the object surface point based on the intersection point.

In an additional or alternative implementation, a method for rendering a specular effect within a three-dimensional model can include rendering a three-dimensional model. In such a case, the three-dimensional model comprises at least one light source. In addition, the method can include creating at least one map of a plane within the three-dimensional model. As such, the at least one map comprises at least one representation of the at least one light source. Additionally, the method can include casting a ray from a surface within the three-dimensional model to the at least one map. Furthermore, the method can include identifying an intersection point between the ray and the at least one map. Still further, the method can include calculating the specular reflection of the surface based on the intersection point.

These and other objects and features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
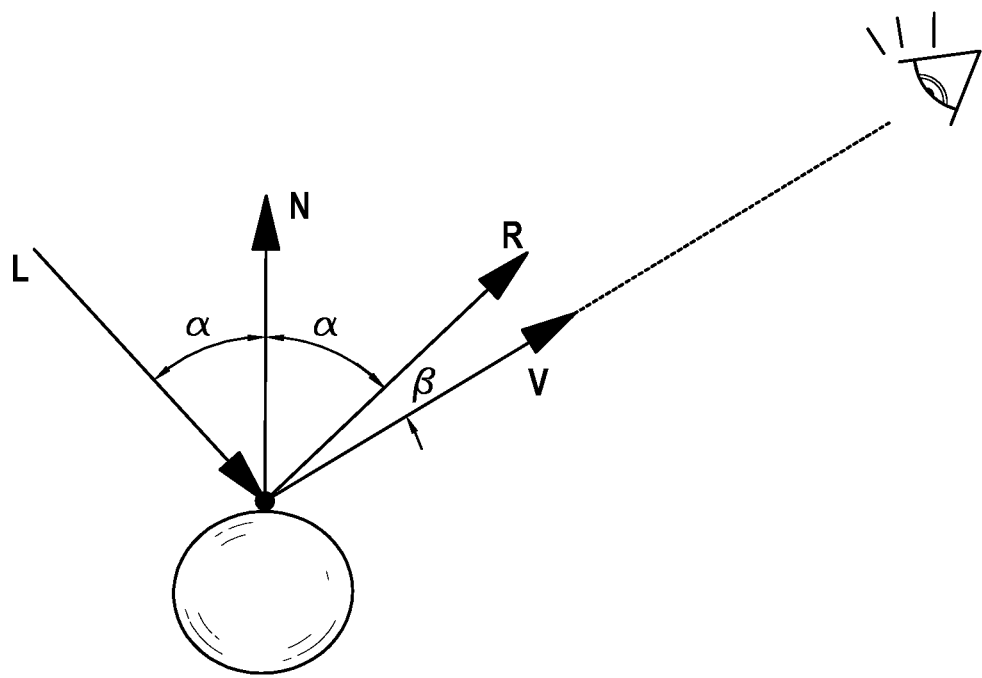
FIG. 1 illustrates a schematic diagram showing the variables involved in modeling specular reflection in the prior art.

Implementations of the present invention extend to systems, methods, and apparatus configured to allow efficient rendering of realistic specular reflection of objects in a design software application. In particular, one or more implementations of the present invention allow for simulation of specular reflection without having to perform a separate calculation for each light in an environment with multiple lights. In addition, one or more implementations of the present invention have the ability to model specular reflection with sufficient realism while turning off lighting in one area of the scene, and while turning on lighting in another area. In general, one or more implementations of the invention provide fast and realistic simulation of specular reflection, allowing real-time rendering of videos and dynamic scenes in applications such as virtual walkthroughs of interior design spaces, video games, and other virtual environments.

For example, one or more implementations of the present invention provide a highly efficient method for rendering specular reflection in an environment having multiple light sources. In particular, one or more implementations use at least one pre-calculated specular intensity gradient to model specular reflection. Additionally, in one or more implementations, a single pre-calculated lighting map can simultaneously account for the effects of multiple light sources. As used within this application, a lighting map is a map that comprises characteristics of at least one light source and is associated with a three-dimensional model such that at least one vector drawn within the three-dimensional model can intersect with the map. This capability can eliminate the need to separately calculate a specular reflection value for each individual light.

Additionally, one or more implementations of the present invention can pre-calculate calculate a lighting map based upon a variety of dynamic lighting conditions. For example, a design software application can pre-calculate a lighting map to reflect which lights within a particular room have been turned on. Further, a design software application can recalculate a lighting map when various lights with the particular room have been turned on or off. By adjusting the effects of individual lights on the lighting map, one or more implementations allow for simulation of dynamic differential lighting in different areas of a layout or scene.

In addition, one or more implementations of the present invention can model specular reflection to simulate a wide range of surface types. For instance, various materials can produce different specular reflection based upon the reflective characteristics of the material. For example, one or more implementations can pre-calculate lighting maps that incorporate a variety of reflective characteristics of surfaces using multiple specular intensity gradients having different rates of attenuation.

This can be computationally efficient because the method can pre-calculate multiple lighting maps for a particular lighting environment. One or more implementations can then use the same lighting maps to model specular refection for different objects in the same lighting environment. Similarly, one or more implementations can also use the same lighting maps to model specular reflection for varying object positions and viewing angles.

Accordingly, one will appreciate in view of the specification and claims herein that at least one implementation of the present invention provides the ability to render a specular effect within a three-dimensional model. Specifically, at least one implementation of the present invention pre-calculates at least one lighting map that comprises characteristics of the lighting within at least a portion of the three-calculate dimensional model. The design software application can then rely upon the information within the at least one lighting map to render a specular effect in real-time.

Figure 2:
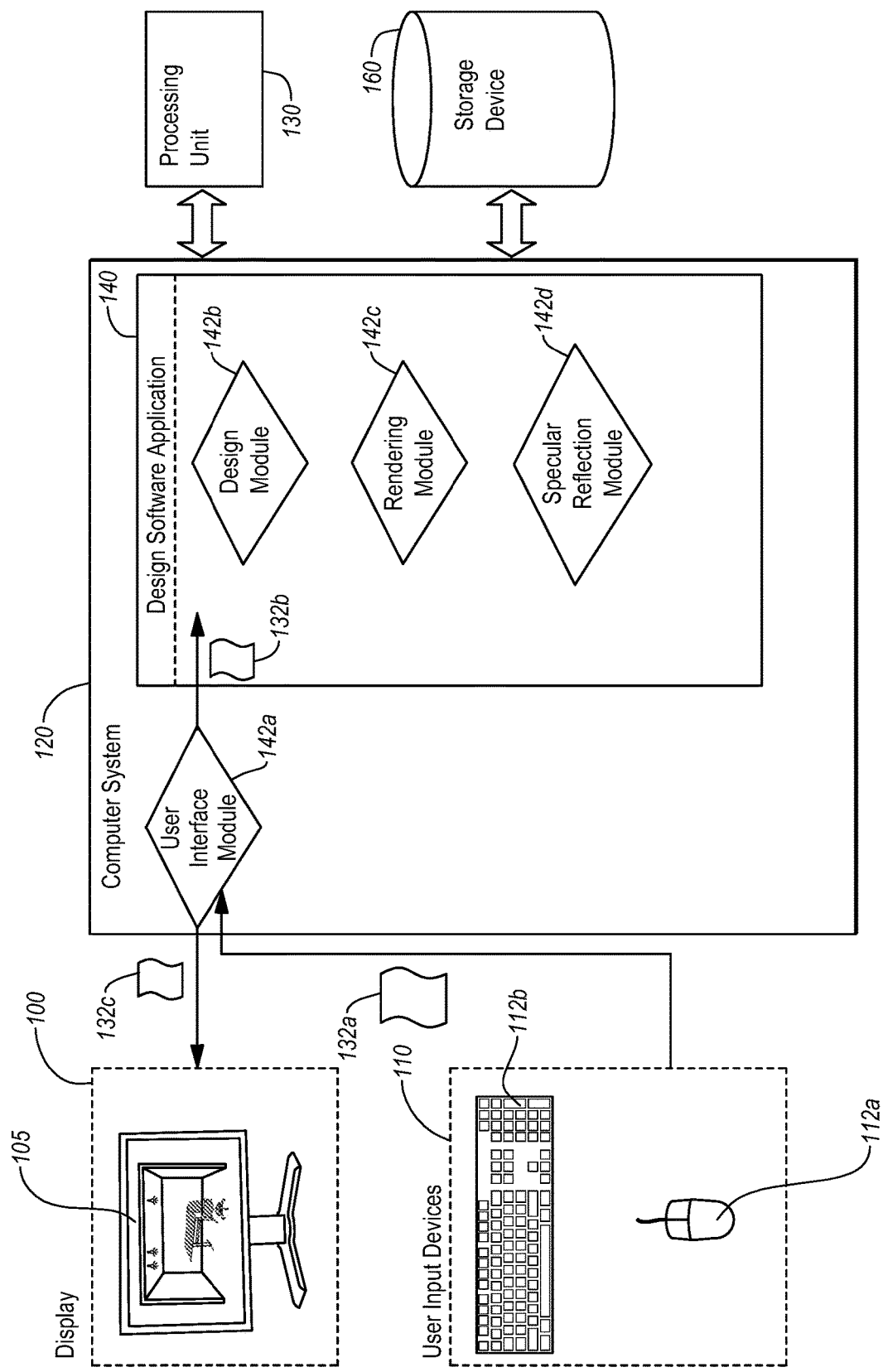
FIG. 2 depicts an architectural schematic diagram of a computer system for rendering specular effect within a three-dimensional model.

Referring now to the figures, FIG. 2 depicts an architectural schematic diagram of a computer system for rendering specular effect within a three-dimensional model. In particular, FIG. 2 shows user input devices 110 that communicate with the computer system 120, which in turn communicates with a display 100. FIG. 2 shows that the user input devices 110 can include any number of input devices or mechanisms, including but not limited to a mouse 112a, a keyboard 112b, or other forms of user input devices (including remote devices, touch screens, etc.,).

In addition, FIG. 2 shows that computer system 120 comprises a design software application 140 executed by a processing unit 130. One will appreciate that the processing unit 130 can comprise a central processing unit, a graphics processor, a physics processor, or any other type of processing unit. FIG. 2 further shows that the computer system 120 can comprise a storage device 160. In one implementation, storage device 160 can contain, among other things, templates and objects that can be placed within a three-dimensional model 105. These components, in conjunction with processing unit 130, store and execute the instructions of design software application 140.

FIG. 2 shows that a user in this case uses the input device(s) 110 to send one or more requests 132a to the computer system 120. In one implementation, the processing unit 130 implements and/or executes the requests from user input devices 110, and application 140 instructions. For example, a user can provide one or more inputs 132a relating to the design and rendering of a three-dimensional model 105 within a design software application 140, as executed by processing unit 130. FIG. 2 further shows that the design software application 140 can then pass the inputs 132b to the appropriate modules within the design software application 140.

Ultimately, design application 140 can then send corresponding rendering instructions 132c through the user interface module 142a to display 100. As shown in FIG. 2, for example, display 100 displays a graphical user interface in which the user is able to interact (e.g., using the user input devices 110). In particular, FIG. 2 shows that the graphical user interface can include a depiction of a three-dimensional model 105 of a design space comprising in this case a chair, a desk, and one or more lighting elements.

One will appreciate in view of the specification and claims herein that the user interface module 142a can provide to the user an option to make design changes to the three-dimensional model 105. In one implementation, for example, upon receiving a request for some modification, the user interface module 142a can communicate the request to the design module 142b.

One will appreciate that the design module 142b can then provide the user with the ability to, among other options, place new objects within the three-dimensional model 105, manipulate and change objects that are already within the three-dimensional model 105, adjust light sources within the three-dimensional model 105, or change parameters relating to the three-dimensional model 105. In some cases, this can include the design module 140b communicating with the storage device 160 to retrieve, among other things, templates and objects that can be placed within a three-dimensional model 105.

After receiving and processing a user input/request, the design module 142b can then send a corresponding request to the rendering module 142c for further processing. In one implementation, this further processing includes rendering module 142c rendering the depiction of the three-dimensional model 105 shown in this case on the display 100 in FIG. 2. One will appreciate that the rendered depiction can include shading and lighting effects within the three-dimensional model 105. The rendering module 142c can then communicate with the storage device 160. In one implementation, information that is accessed frequently and is speed-sensitive will be stored within a high-speed memory.

FIG. 2 further shows that the rendering module 142c can communicate with a specular reflection module 142d. In one implementation, the specular reflection module 142d can calculate the specular effects, including specular reflections, for a three-dimensional model 105. Specifically, the specular reflection module 142d can calculate the effect of multiple light sources on specular effects within the three-dimensional model 105 and store those calculations within at least one lighting map. The rendering module 142c, using the calculations, can then render specular effects within the three-dimensional model 105 in real-time without respect to the number of light sources that are contained within the three-dimensional model 105.

When a user makes changes to the lighting sources within the three-dimensional model 105, the specular reflection module 142d can automatically recalculate the at least one lighting map, taking into account the changes to the light sources. In at least one implementation, the specular reflection module 142d can calculate the specular effects within either the entire three-dimensional model 105 or just a portion of the three-dimensional model 105.

Once the specular reflection module 142d has initially calculated at least one lighting map, in at least one implementation, the at least one lighting map will not be recalculated until a design change is made to the three-dimensional model 105. Additionally, in at least one implementation, the calculation time for creating a lighting map may increase with the number of light sources present within the three-dimensional model. Once the lighting map is calculated, however, the rendering module 142c can render a three-dimensional model 105, including specular effects, in real-time.

Figure 3:
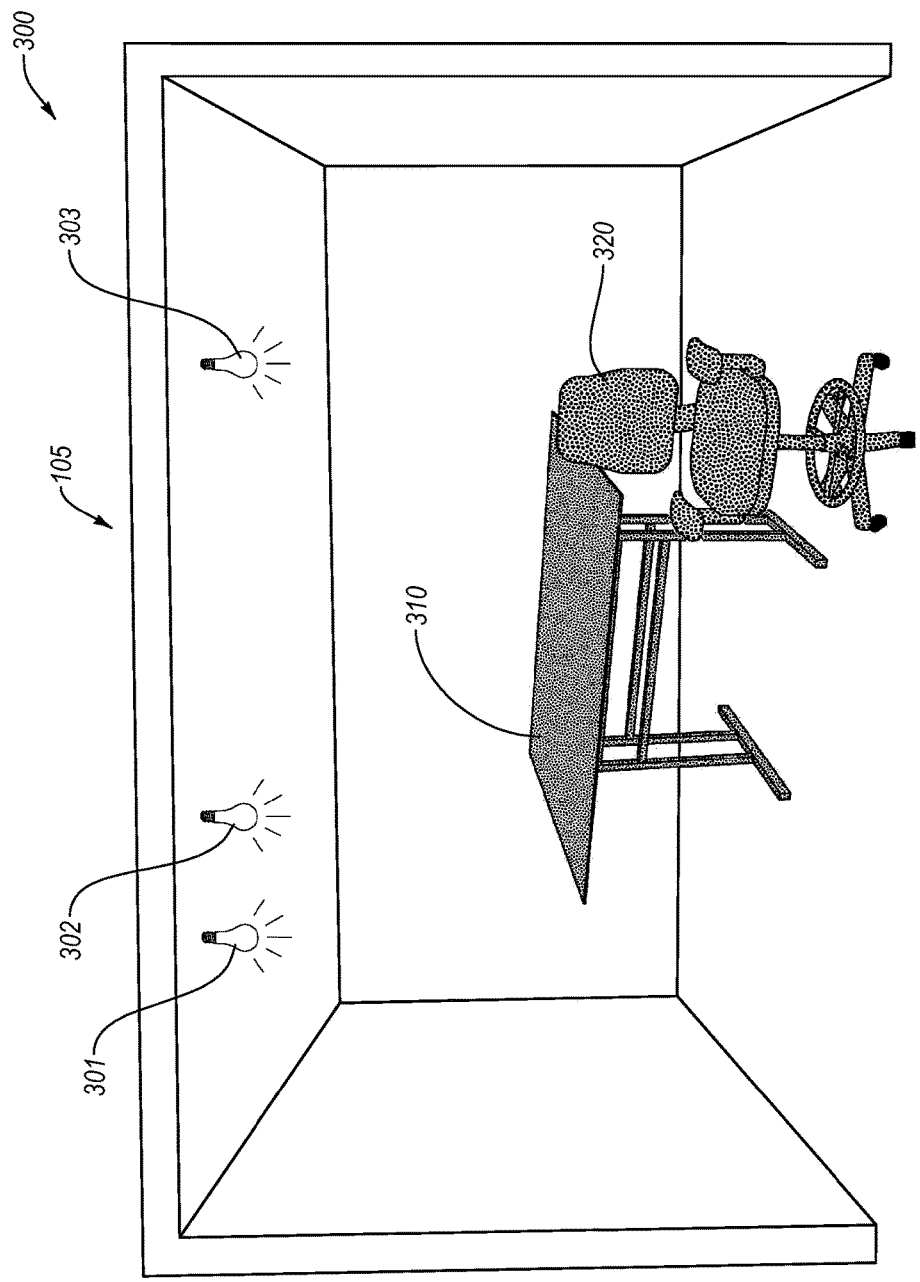
FIG. 3 illustrates a model of a room including furniture without specular reflection.

FIG. 3 depicts a three-dimensional model 105 of a room 300 containing a desk 310, a chair 320, and several lights 301, 302, 303. In this case, FIG. 3 does not depict any specular effects within the three-dimensional model 105. In at least one implementation, the room 300 of FIG. 3 can be part of a larger three-dimensional model 105 of a building.

Additionally, in one or more implementations of the present invention, the specular reflection module 142d can create a map that contains information relating to each of the lighting sources 301, 302, 303. Further, the information relating to each of the light sources can comprise gradients of specular intensity and locations of light sources with respect to a plane in the three-dimensional model 105.

Figure 4:
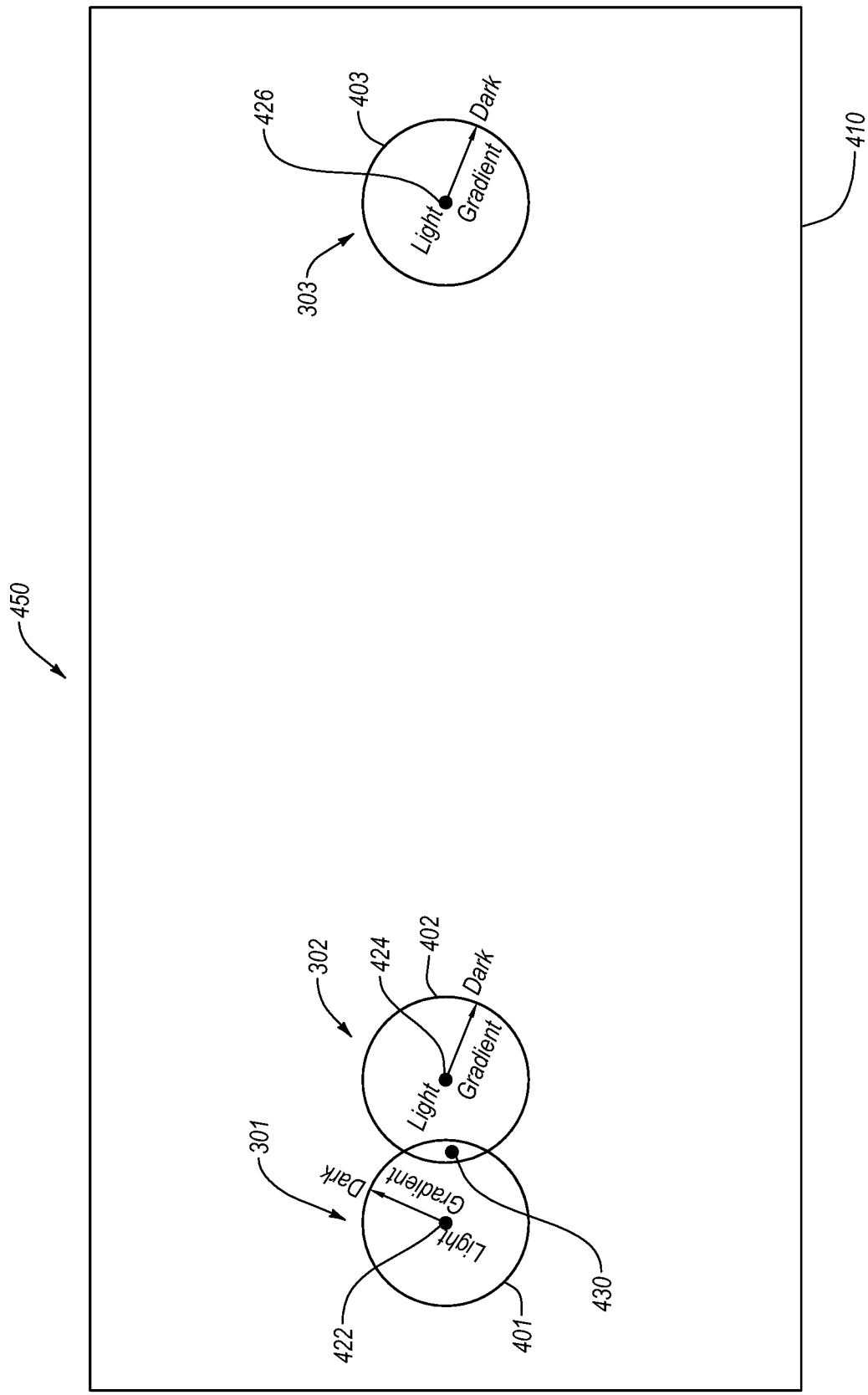
FIG. 4 illustrates a specular intensity map based on the room illustrated in Figure.

For example, FIG. 4 shows a glossy lighting map 450 including indications 401, 402, 403 of the light sources 301, 302, 303 respectively from FIG. 3. In at least one implementation, the indications 401, 402, 403 of the light sources 301, 302, 303 comprise gradients representing the diffusion of each respective light source over a glossy surface. Further, in at least one implementation, the gradients are brightest in the center and gradually grow dimmer moving radially outward from the center point of the gradient.

Additionally, in at least one implementation, the specular reflection module 142d creates the glossy specular map 450 based upon a plane 410 within the three-dimensional model 105 of FIG. 3. In at least one implementation, the specular reflection module creates the glossy specular map 450 based upon a plane 410 within the three-dimensional model 105 of FIG. 3 that contains the actual light sources 301, 302, 303.

In contrast, in at least one implementation, the specular reflection module 142d can select a plane that does not intersect any light sources. For example, in at least one implementation, the light sources may not be on a single plane. The specular reflection module 142d can select a plane 410 substantially parallel to the floor or ceiling of the environment and create a glossy lighting map 450 that models all of the light sources 301, 302, 303 within the model 105, even if those light sources do not intersect the plane.

One will understand that in at least one implementation, the specular reflection module 142d is not limited to selecting planes with specific orientations. For example, the specular reflection module 142d can select a plane that is not parallel to the floor or ceiling and still create a lighting map 450 that models at least one light source.

When the light sources are not on a single plane, in at least one implementation, the specular reflection module 142d can create a map of the characteristics of the light by calculating the normal projections of the lights on the plane. In at least one implementation of the invention, the specular reflection module 142d maps the characteristics of the light sources 301, 302, 303 onto the plane 410 by other methods, such as extending from a light source a line that is normal to the floor or ceiling of a room, and identifying the intersection of the line on the plane as the location of the light source.

Additionally, in at least one implementation, the specular reflection module 142d can use two or more planes for mapping light locations. This can be particularly useful when lights are situated on two or more elevations within a room 300, such as in a room 300 with a number of ceiling lights inset into the ceiling and a number of pendant lights hanging from the ceiling.

For example, the specular reflection module 142d can create two different planes that are substantially parallel to the floor and/or ceiling of the interior environment. Further, in at least one implementation, the specular reflection module 142d can place one plane at the ceiling, such that it intersects the ceiling lights, and place the other ceiling such that it intersects the pendent lights. Further still when additional lights are situated off the two planes, in at least one implementation, the specular reflection module 142d can map the additional lights onto the closest plane by the lights' normal projections on the plane.

Figure 6:
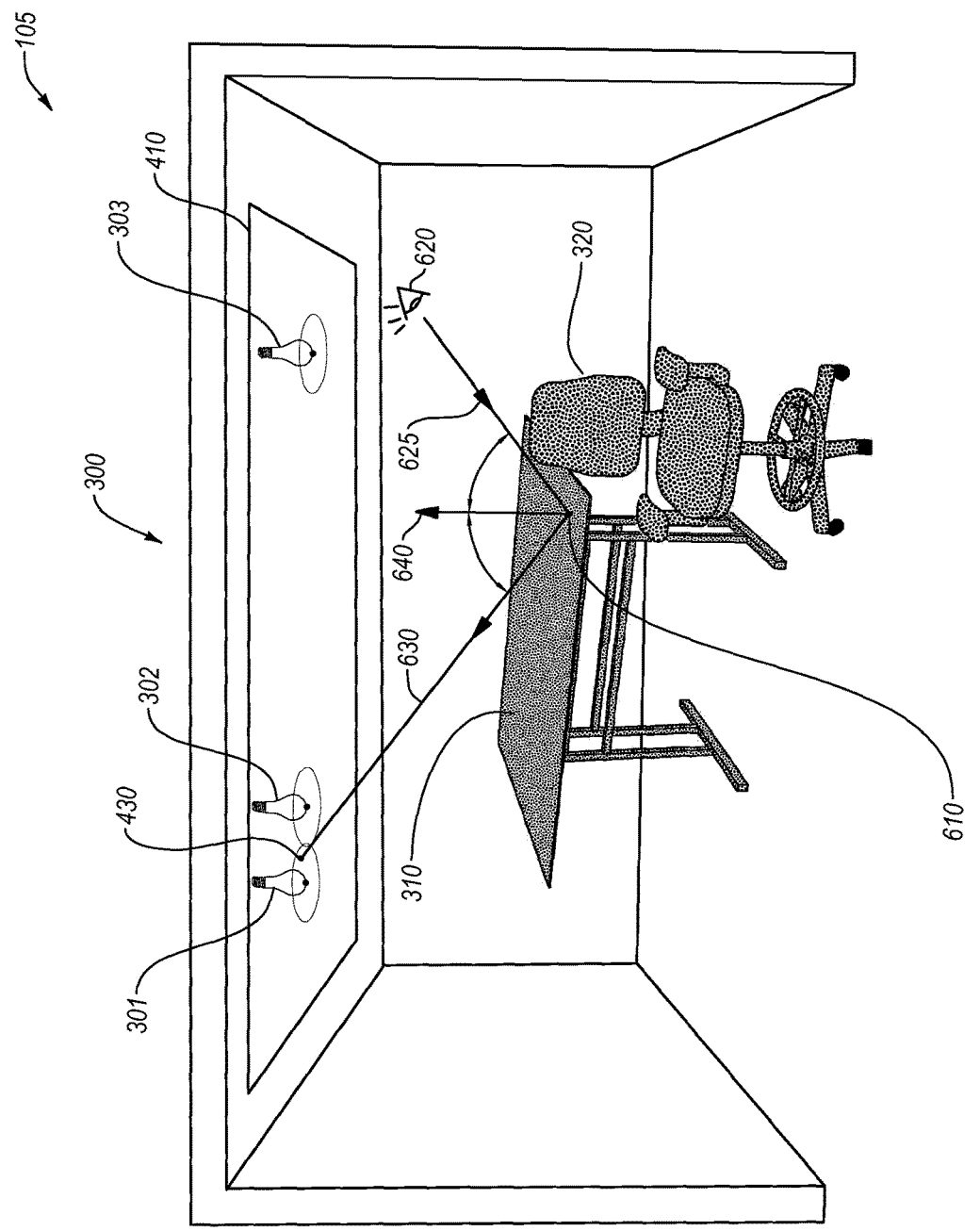
FIG. 6 illustrates the room of FIG. 3, comprising vectors used in the calculation of specular effect.

FIG. 6 shows that in room 300 at least one implementation of the invention identifies a plane 410 at light sources 301, 302, and 303. In this example, plane 410 is substantially parallel to the floor and ceiling of the room 300. Light sources 301, 302, and 303 are mapped to points 422, 424, and 426, respectively as shown in FIG. 4.

After identifying a plane and the locations of the light sources on the plane, in at least one implementation, the specular reflection module 142d can calculate an attenuating gradient of specular intensity 401, 402, 403 on the map 450. In at least one implementation, the specular intensity values of the attenuating gradient can provide a basis for simulating the specular reflection on objects to be imaged in the environment.

In at least one implementation, specular intensity attenuates as the distance from the mapped location of a light increases. For example, as depicted in FIG. 4, light source 301 has been mapped at point 422. In at least one implementation, the specular intensity 401 associated with the light 301 decreases radially. For instance, in at least one implementation, the specular reflection module 142d can model the attenuating gradient of specular intensity as a 3-D Gaussian function, where the origin of the (x,y) plane coincides with the mapped location of the light source.

Additionally, in at least one implementation, the specular reflection module can use functions other than the 3-D Gaussian function to model a specular intensity gradient. For instance, at least one implementation can use a 3-D cosine function, where the peak of the function coincides with the location the light source on the map. Similarly, at least one implementation can empirically modify the shape of the 3-D cosine function to achieve a specular intensity gradient effecting realistic specular reflection. For instance, at least one implementation can raise the cosine function to the power of n to simulate the effect of surfaces of different reflective properties.

Additionally, in at least one implementation, the specular intensity at a point on the map depends on the distance between the location of the light within the three-dimensional model 105 and the plane that the specular reflection module 142d selected. For example, in FIG. 6 the specular reflection module 142d selected a plane 410 that intersected with the lights 301, 302, 303, such that the specular intensity of map 450 is at a relative maximum. In contrast, if the specular reflection module 142d selected a plane 410 that was medial to the lights 301, 302, 303 and the floor of the room 300, then the specular intensity of the map would be appropriately diminished.

Similarly, in at least one implementation the specular intensity of the attenuating gradient 401, 402, 403 may depend on the brightness of the light source 301, 302, 303, such that a brighter light source leads to higher specular intensity values. In these implementations where specular intensity depends on the brightness of the light source or its distance from the plane, a brightness or distance factor may be added to or multiplied by the specular intensity values.

Furthermore, as appreciated by one skilled in the art, the specular intensity value can be a scalar for rendering of a gray scale image. In color image rendering, the specular intensity value can comprise a vector. For instance, it can be a vector [R, G, B] to represent the red, green, blue light intensity in the RGB color space for additive color rendering. In at least one implementation of the invention, the specular intensity value can be a vector of [C,M,Y,K] representing the colors cyan, magenta, yellow, and key (black) in a subtractive CMYK color model. One will understand that the color can be stored within a variety of models and still be within the scope of the present invention.

In at least one implementation, one of the advantages of the present invention is that it can efficiently simulate specular reflection of objects in environments with multiple light sources. According to the present invention, a single lighting map 450 accounts for the effects of multiple light sources 301, 302, 303. For instance, in at least one implementation of the present invention, two or more light sources' effects 401, 402 are combined 430 in an additive fashion (e.g., at point 430), generating an intensity map with multiple peaks and/or troughs between peaks.

Additionally, in at least one implementation of the present invention, the rate at which a specular intensity gradient attenuates is determined by the reflectivity or glossiness of the surface of the object to be imaged. In such implementations, a more reflective or glossier surface tends to have a specular intensity gradient attenuating at a higher rate than a duller or rougher surface. Accordingly, at least one implementation generates multiple lighting maps for the calculation of specular reflection for different types of surfaces.

Figure 5:
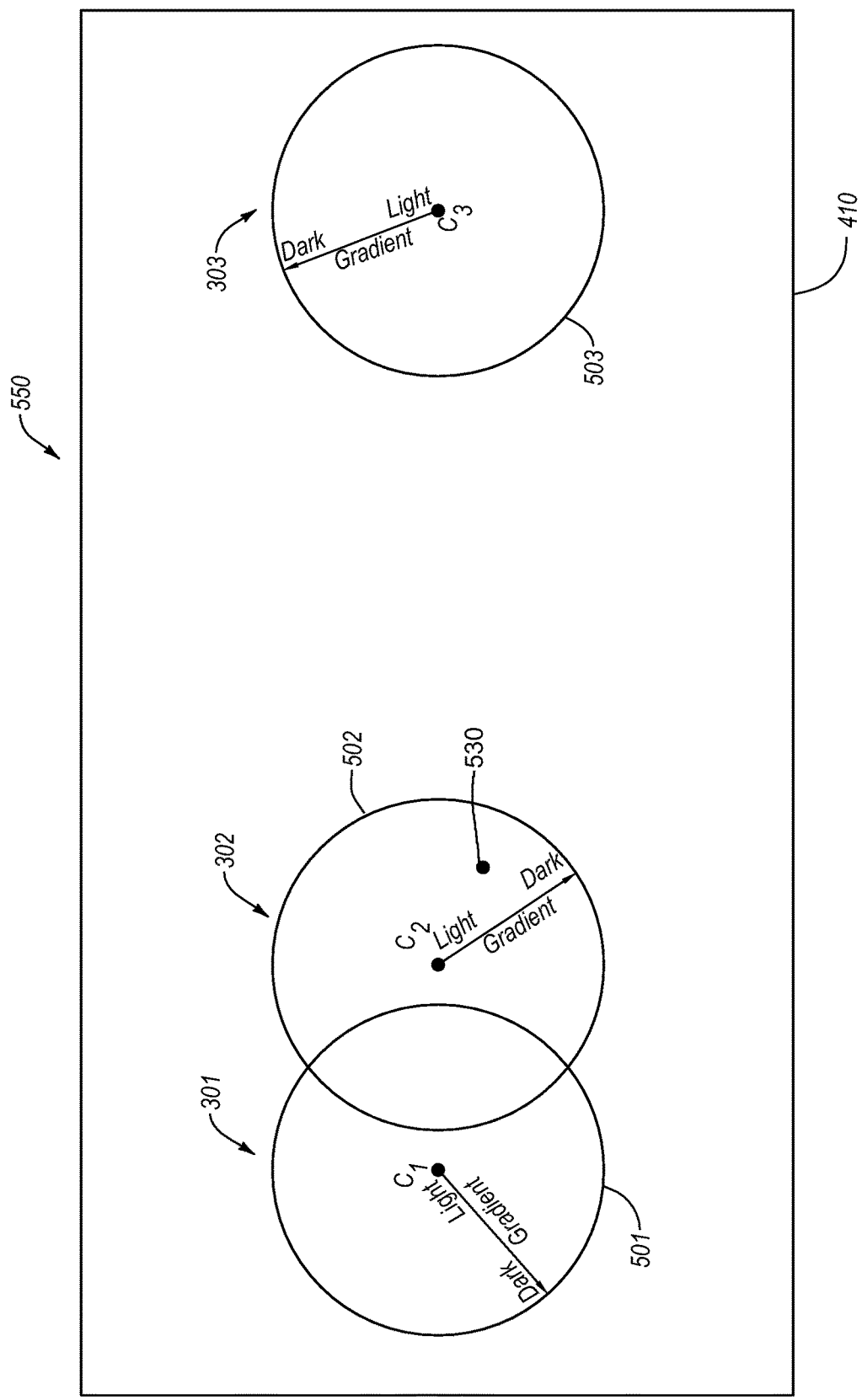
FIG. 5 illustrates another specular intensity map similar to that in FIG. 4.

For example, FIG. 5 illustrates a matte lighting map 550 similar to the glossy lighting map 450 depicted in FIG. 4, but showing specular reflection gradients 501, 502, 503 adapted to calculate the specular reflection of surfaces that are less reflective than those in FIG. 4. In at least one implementation, the rendering module 142 can use this matte lighting map 550 to give a surface the appearance of a matte look.

In at least one implementation of the present invention, the specular reflection module 142d can pre-calculate both the glossy lighting map 450 in FIG. 4 and the matte lighting map 550 in FIG. 5. The two maps 450, 550 can then be repeatedly used in a real-time calculation of specular reflection of shinier surfaces and duller surfaces, respectively. One will understand that, in one or more implementations, more than two lighting maps can be generated.

For example, FIG. 6 is a diagram illustrating a method for calculating a specular effect at point 610 on the desk 310 within the three-dimensional model 105. In the implementation depicted by FIG. 6, a user's perspective 620 within the three-dimensional model 105 is such that the viewing ray 625 extending from the user's perspective 620 intersects with point 610 on the desk 310.

In at least one implementation, the specular reflection module 142d calculates the specular effect at point 610 by first determining the reflective properties of point 610. As depicted in FIG. 6, point 610 is positioned on the surface of desk 310 and as such likely comprises glossy properties. Once the specular reflection module 142d determines the reflective properties of point 610 it can select the proper lighting map. When the reflective properties of a particular object's surface falls between the values described by two lighting maps 450, 550, the rendering module 142c can interpolate between the two lighting maps 450, 550 to calculate a specular effect for the object. In the example of FIG. 6, for the sake of clarity, the specular reflection of the surface of the desk 310 matches the glossy lighting map 450.

The specular reflection module 142d can then determine the specular effect at point 610 by calculating a reflection ray 630 of the viewing ray 625. Various methods are known in the art for calculating a reflection vector. For example, the specular effect module 142d could use r=v−2(v·n)n, where v is the viewing ray and n is the normal vector 640 of point 610.

After calculating the reflection ray 630, the specular reflection module 142d can determine the intersection point 430 of the reflection ray 630 and the glossy lighting map 450. As used within this application, the "intersection point" is the location where the reflection ray 630 and the lighting map 430 intersect. In at least one implementation, the intersection point 430 can be calculated by determining where the reflection ray 630 intersects with the plane 410 on which the lighting map 450 was based. In such a case, the intersection point 430 would be the equivalent point on the lighting map 450.

In at least some implementations, the intersection point (e.g., 430) on the map contains specular reflection information that can be applied to the object. For example, in the depicted implementation, the specular reflection module 142d can create the glossy lighting map 450 due to the reflective properties of point 610 on the desk 310. The rendering module 142c can then use information that is stored at intersection point 430 within the glossy lighting map 450 to render a specular effect at point 610 on the desk 310. In at least one implementation, the information at the intersection point (e.g., 430) can comprise an intensity value that the rendering module 142c can use to determine an intensity of specular effect to apply to a certain point.

FIG. 4 and FIG. 6 illustrate that reflection ray 630 intersects with glossy lighting map 450 at intersection point 430. The specular reflection module 142d can determine the specular effect at point 610 by using the information stored at point 430 within the glossy lighting map 450. One will understand that because point 430 on the glossy map 450 falls within the specular intensity gradients 401, 402 of both light source 301 and light source 302, the specular effect at point 610 is being influenced by both light sources 301, 302.

Additionally, in at least one implementation, the specular reflection module 142d can also account for the distance between point 610 and intersection point 430 when determining the specular effect at point 610. One will understand that the greater the distance that point 610 is away from a particular light source, the relatively less specular effect that will be caused by the particular light source.

In at least one implementation, the specular reflection module 142d can determine that reflection ray 630 intersects with a surface within the three-dimensional model 105 prior to intersecting with the glossy lighting map 450. For example, the reflection ray might intersect with another piece of furniture. In this case, the specular reflection module 142d can determine that there is no specular effect at point 610 because the specular effect is being blocked by a surface.

Figure 7:
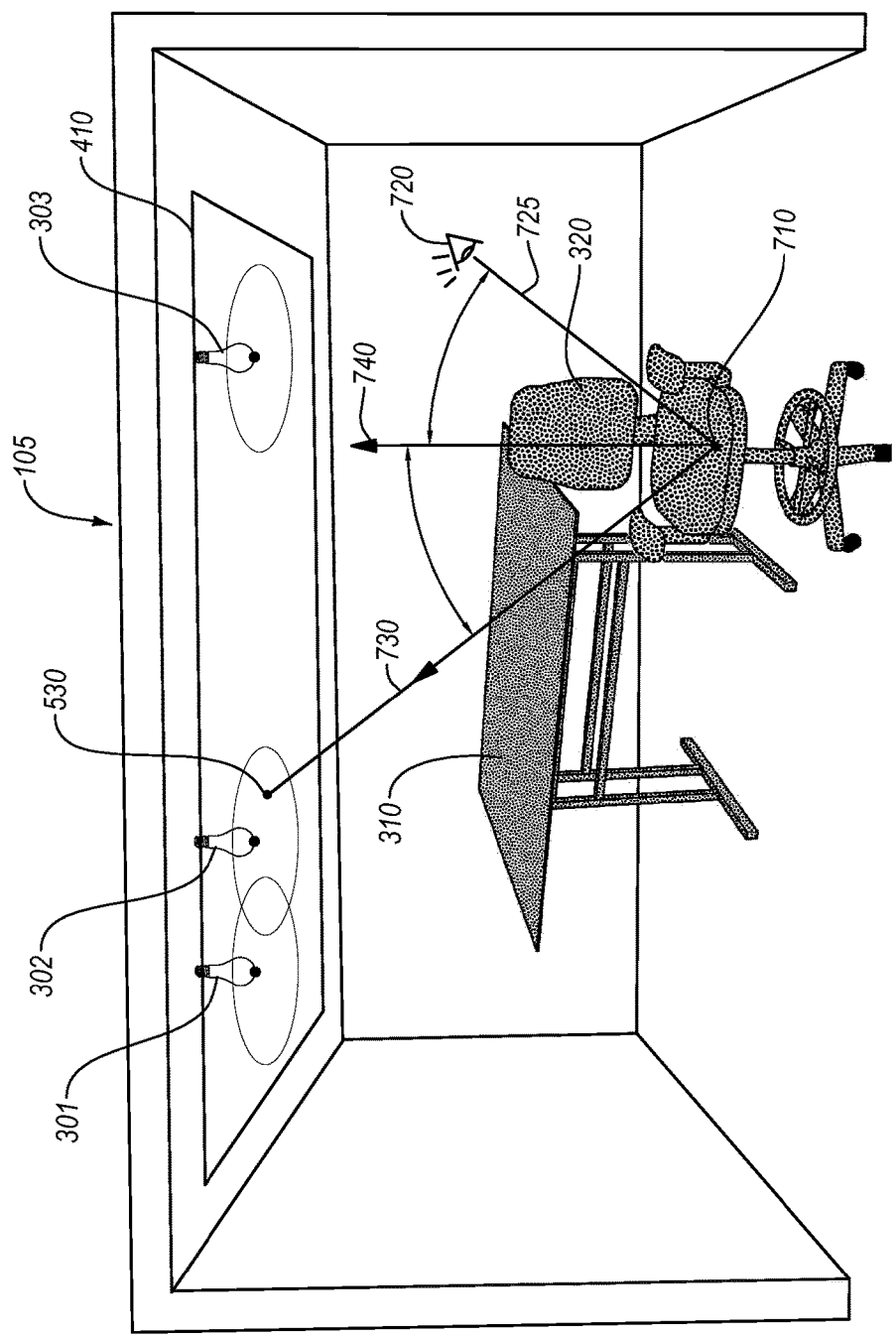
FIG. 7 illustrates the room of FIG. 3, comprising another set of vectors used in the calculation of specular effect.

FIG. 7 is a diagram similar to that of FIG. 6, except that it demonstrates the modeling of specular reflection at point 710 on the chair 320 instead of point 610 on the desk 310. The same principles and methods described above for modeling the reflection of point 610 on the desk 310 also apply here. Because point 710 of chair 320 has a rougher and duller surface than point 610 on the desk 310, this example implementation uses the matte lighting map 550 of FIG. 5. The matte lighting map 550 has a lower rate of attenuation, and thus more realistically reflects the appearance of specular effects on the chair 320 surface.

The examples given so far use two predetermined specular intensity gradients. As explained above, at least one implementation of the invention can create more specular gradients to simulate different levels of shininess and surface texture characteristics. Additionally, in at least one implementation, the specular reflection module 142d can determine the intersection of a reflection ray and multiple lighting maps (to determine the "intersection point"). The specular reflection module 142d can then use the information from the multiple lighting maps to interpolate a proper specular effect for a particular surface.

For example, in at least one implementation, the specular reflection module 142d can create multiple lighting maps, each of which contains lighting characteristics from different light sources within the three-dimensional model 105. The lighting maps can each respectively be based upon light sources that are at different elevations within the three-dimensional model 105. In this implementation, the specular reflection module 142d can determine the intersection points (e.g., 430, 530) of a reflection ray and each of the lighting maps. The resulting information derived from the intersection points can then be additively used to determine the specular effect at a surface caused by all of the light sources at the various elevations.

Figure 8:
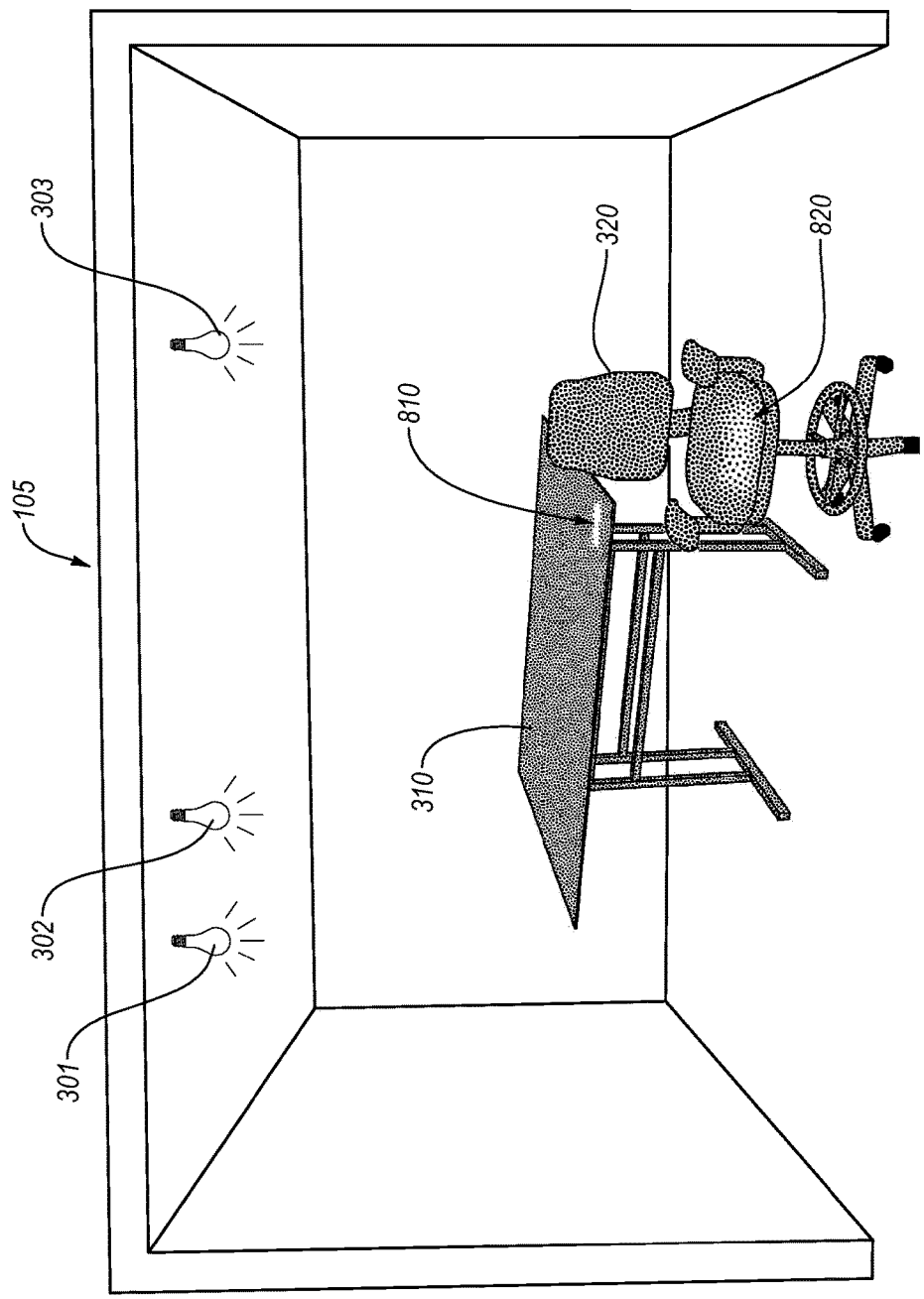
FIG. 8 illustrates the furniture in the same interior environment as FIG. 3, albeit with the furniture now comprising a specular effect.

FIG. 8 is an illustration of the desk 310 and chair 320 of FIG. 6 and FIG. 7, except that FIG. 8 comprises specular reflections 810 and 820 on the desk 310 and chair 320 respectively. The specular reflection can add a shiny and hard surface quality to the desk 310, and it can give a matte appearance to the chair 320. One will understand that the ability to utilize specular effects within a three-dimensional model 105 can increase the realistic qualities of the model 105.

Accordingly, FIGS. 1-8 and the corresponding text illustrate or otherwise describe one or more components, modules, and/or mechanisms for rendering specular effects within a three-dimensional model 105. One will appreciate that implementations of the present invention can allow a designer to create an office building with multiple light sources and have the specular effect from each of those light sources rendered within the three-dimensional model 105. Additionally, one will appreciate that rendering the specular effects created by multiple light sources within a three-dimensional model can aid users in the selection of surfaces within a designed building.

Figure 9:
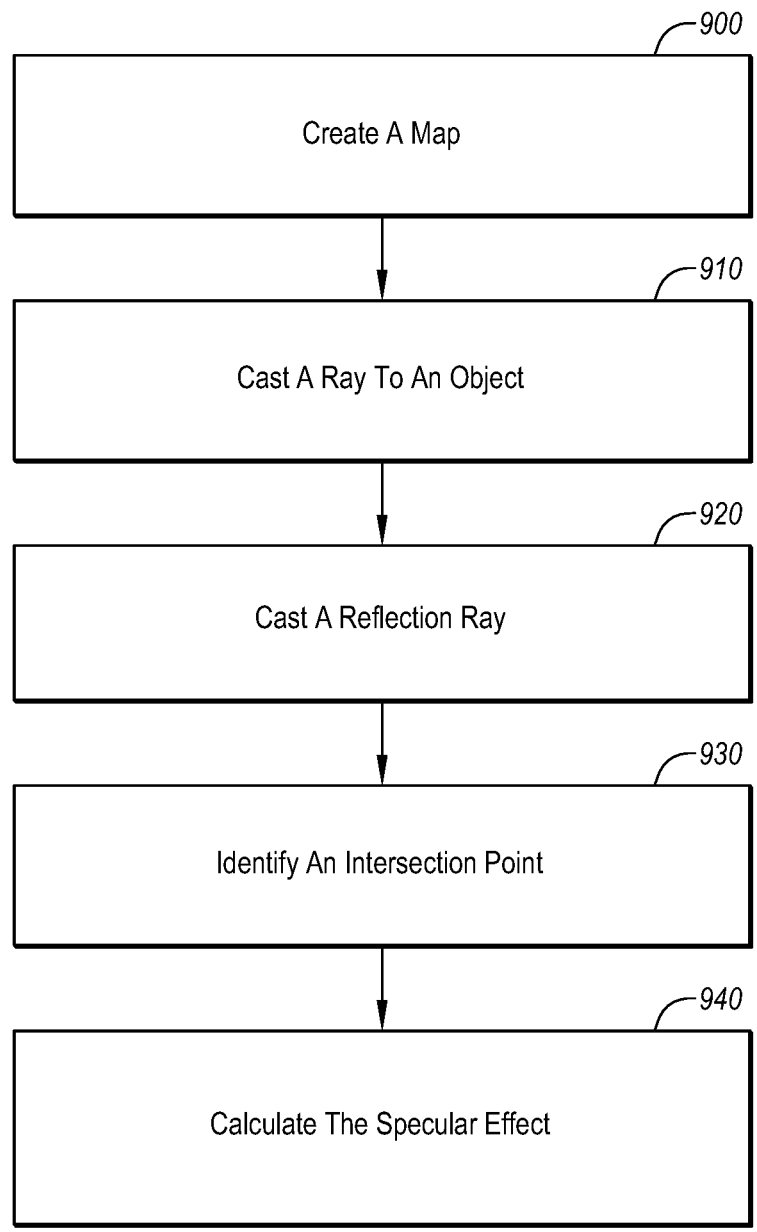
FIG. 9 illustrates a flowchart of a series of acts in a method in accordance with an implementation of the present invention for rendering specular reflection in computer-generated graphics.

For example, FIG. 9 illustrates that a method for rendering specular effects within a three-dimensional model can comprise an act 900 of creating a map. Act 900 includes creating a map that comprises a representation of at least one light source within a three-dimensional model. For example, FIGS. 4 and 5 show different maps that comprise different representations of each light source within the three-dimensional model.

FIG. 9 also shows that the method can comprise act 910 of casting a ray to an object. Act 910 includes casting a viewpoint ray to an object surface point, wherein the viewpoint ray comprises a ray extending from a user perspective within the three-dimensional model. For example, FIGS. 6 and 7 show rays 625 and 725 being cast from user perspective 620 and 720 and being directed towards a desk 310 and a chair 320, respectively.

Additionally, FIG. 9 shows that the method can comprise act 920 of casting a reflection ray. Act 920 includes casting a reflection ray of the viewpoint ray. For example, FIGS. 6 and 7 show reflection rays 630 and 730 being cast as reflections of rays 625 and 725, respectively.

Furthermore, FIG. 9 also shows that the method can comprise act 930 of identifying an intersection point 430, 530. Act 930 includes identifying an intersection point 430, 530 between the reflection ray and the map. FIGS. 4-7 all show an intersection point between reflection rays 630, 730 and maps 450, 550, respectively (i.e., intersection points 430, 530).

Still further, FIG. 9 shows that the method can comprise act 940 of calculating the specular effect. Act 940 includes calculating a specular effect on the object surface point based on the intersection point 430, 530. For example, FIGS. 6 and 7, and the resulting FIG. 8, depicts a three-dimensional model, comprising vectors that can be used in the calculation of specular effect. Specifically, in FIGS. 6 and 7 the rays 630 and 730 are depicted intersecting with lighting maps 450 and 550, respectively. The inventive software can then use the intersection points 430 and 530 to calculate a specular effect on the object surface.

Figure 10:
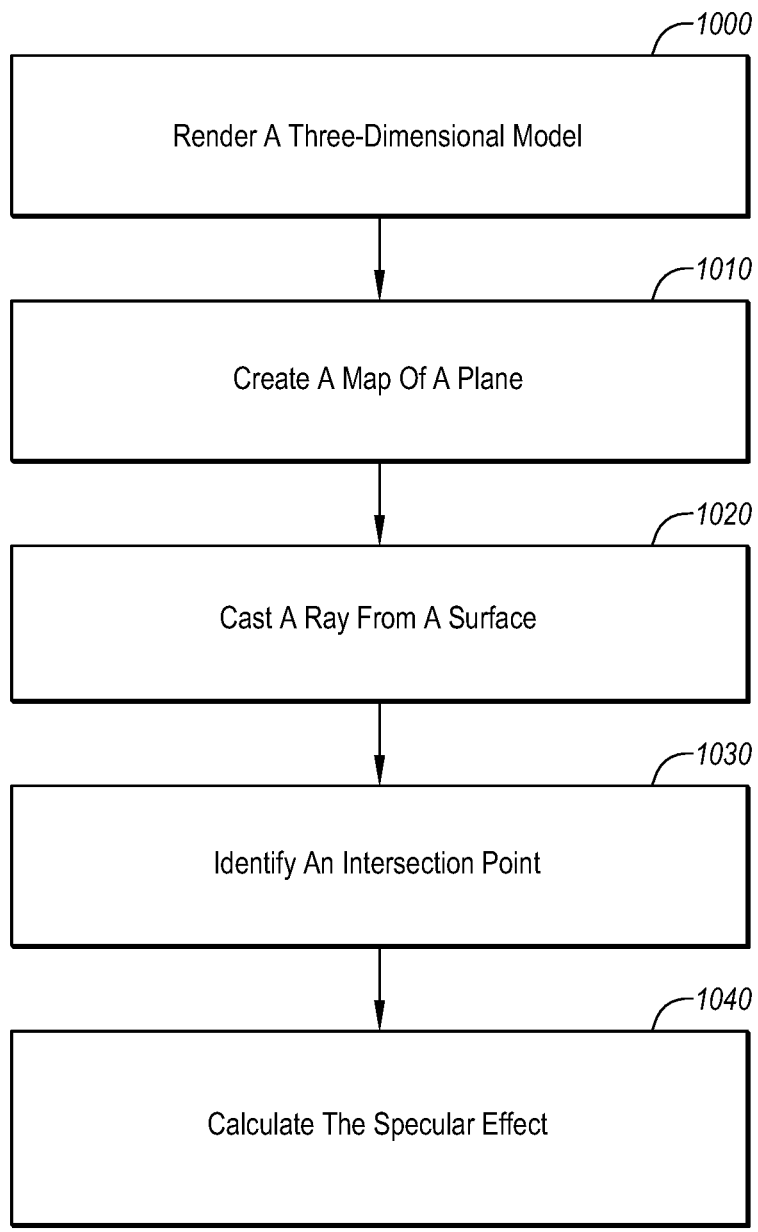
FIG. 10 illustrates another flowchart of a series of acts in a method in accordance with an implementation of the present invention for rendering specular reflection in computer-generated graphics.

In addition to the foregoing, FIG. 10 shows that a method of rendering specular effects within a three-dimensional model can comprise an act 1000 of rendering a three-dimensional model 105. Act 1000 includes rendering a three-dimensional model 105, the three-dimensional model comprising at least one light source. For example, FIG. 3 shows a rendered three-dimensional model having three light sources.

FIG. 10 also shows that the method can comprise an act 1010 of creating a map of a plane. Act 1010 includes creating at least one map of a plane within the three-dimensional model, the at least one map comprising at least one representation of the at least one light source. For example, FIGS. 4 and 5 show different maps that comprise different representations of each light source within the three-dimensional model 105.

Additionally, FIG. 10 shows that the method can comprise an act 1020 of casting a ray from a surface. Act 1020 includes casting a ray from a surface within the three-dimensional model to the at least one map. For example, FIGS. 6 and 7 show rays 630 and 730 being cast to maps 450 and 550, respectively.

FIG. 10 also shows that the method can comprise act 1030 of identifying an intersection point (e.g., intersection points 430 and 530). Act 1030 includes identifying an intersection point between the ray and the at least one map. FIGS. 4-7 show intersection points 430 and 530 between reflection rays 630, 730 and maps 450, 550, respectively.

Furthermore, FIG. 10 shows that the method can comprise an act 1040 of calculating the specular effect. Act 1040 can include calculating a specular effect on the surface based on the intersection point. For example, FIG. 6, and the resulting FIG. 8, depict a three-dimensional model, comprising vectors that can be used in the calculation of specular effect. Specifically, in FIG. 6 the ray 630 is depicted as intersecting with lighting map 450. The inventive software can then use the intersection point 430 to calculate a specular effect on the object surface.

Accordingly, FIGS. 1-10, and the corresponding text, illustrate or otherwise describe a number of components, schematics, and mechanisms for providing for the rendering of specular effects within a three-dimensional model. One will appreciate in view of the specification and claims herein that the components and mechanisms of the present invention provide the ability to model specular reflection with sufficient realism while turning off lighting in one area of the scene and turning on lighting in another area. In general, one or more implementations of the invention provide fast and realistic simulation of specular reflection, allowing real-time rendering of videos and dynamic scenes in applications such as virtual walk-throughs of interior design spaces, video games, and other virtual environments The embodiments of the present invention may comprise a special purpose or general-purpose computer including various computer hardware components, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The present invention may be embodied in other specific forms without departing from its spirit or essential characteristics. For example, the flexible dies can include flexible protrusions on both the front and back surfaces. Thus, a single flexible die can form recesses into surfaces of two different panels at the same time. Furthermore, the panels can include recesses in both the front and back surfaces. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. In a computerized architectural design environment in which a design program is loaded into memory and processed at a central processing unit, a computer-implemented method for rendering a specular effect within a three-dimensional model, the method comprising:
    creating a map that comprises a representation of at least one light source within the three-dimensional model, wherein:
        the at least one light source represented in the map is represented by at least one specular intensity gradient that comprises an attenuating gradient that is determined at least in part by a particular reflective surface type, and
        the map comprises two or more specular intensity gradients with different rates of attenuation;
    casting a viewpoint ray to an object surface point, wherein the viewpoint ray comprises a ray extending from a user perspective within the three-dimensional model;
    casting a reflection ray of the viewpoint ray;
    identifying an intersection point between the reflection ray and the map, wherein the intersection point comprises a particular specular intensity gradient value based upon at least one of the two or more specular intensity gradients that is determined at least in part by the particular reflective surface type;
    calculating a specular effect on the object surface point based on the intersection point between the reflection ray and the map, wherein the specular effect is calculated at least in part based upon the particular specular intensity gradient value; and
    displaying the map that comprises the representation of the at least one light source within the three-dimensional model.

2. The method as in claim 1, wherein the specular intensity gradient on the map decreases as a distance between a location of the at least one light source and a representation of the at least one light source on the map increases.

3. The method as in claim 1, wherein the specular intensity gradient is defined by a 3-D Gaussian or 3-D cosine function.

4. The method as in claim 1, wherein the specular intensity gradient depends on the brightness of the at least one light source.

5. The method as in claim 1, further comprising displaying the map that comprises the representation of the at least one light source within the three-dimensional model.

6. The method as in claim 1, wherein the particular specular intensity gradient value is a vector of R, G, B values.

7. The method as in claim 1, wherein the particular specular intensity gradient value is a vector of C, M, Y, K values.

8. In a computerized architectural design environment in which a design program is loaded into memory and processed at a central processing unit, a computer-implemented method for rendering a specular effect within a three-dimensional model, the method comprising:
    rendering a three-dimensional model, the three-dimensional model comprising at least one light source;
    creating two or more maps of a plane within the three-dimensional model, the two or more maps each comprising a specular intensity gradient representation of the at least one light source;
    creating a first attenuating gradient of specular intensity on a first map of the two or more maps, the first attenuating gradient being calculated based upon a first surface reflectivity value;
    creating a second attenuating gradient of specular intensity on a second map of the two or more maps, the second attenuating gradient being calculated based upon a second surface reflectivity value, which is different from the first surface reflectivity value;

casting a first ray from a rendered surface within the three-dimensional model to the first map;

identifying a first intersection point between the first ray and the first attenuating gradient of specular intensity on the first map of the two or more maps;

casting a second ray from the rendered surface within the three-dimensional model to the second map;

identifying a second intersection point between the second ray and the second attenuating gradient of specular intensity on the second map of the two or more maps;

determining that a surface reflectivity value of the rendered surface within the three-dimensional model is between the first surface reflectivity value and the second surface reflectivity value; and calculating a specular reflection of the rendered surface based on the intersection points by interpolating between information stored at the first intersection point and information stored at the second intersection point.

9. The method as in claim 8, wherein the specular intensity gradient representation of the at least one light source comprises an attenuating gradient that is determined at least in part by a reflective surface type of the surface.

10. The method as in claim 8, wherein the specular intensity gradient value depends on a distance between a light source and the plane.

11. The method as in claim 8, wherein an effect of two or more light sources on the specular intensity gradient value is cumulative.

12. The method as in claim 8, wherein the plane is substantially parallel to the floor and/or ceiling in the three-dimensional model.

13. The method as in claim 8, wherein the at least one light source is on the plane, and the at least one representation of the at least one light source on the plane is equivalent to the at least one light source's normal projection on the plane.

14. The method as in claim 8, further comprising creating two or more planes, wherein each plane comprises at least one representation of one or more light sources that intersects with each respective plane.

15. The method as in claim 8, further comprising determining specular reflection values for additional points on the surface of the object by interpolation of specular reflection values of two or more object surface points.

16. A computer system for efficiently rendering specular effect, comprising:

one or more processors; and one or more computer-readable media having stored thereon executable instructions that when executed by the one or more processors configure the computer system to perform at least the following:

create a map that comprises a representation of at least one light source within a three-dimensional model, wherein:

the at least one light source represented in the map is represented by at least one specular intensity gradient that comprises an attenuating gradient that is determined at least in part by a particular reflective surface type, and that map comprises two or more specular intensity gradients with different rates of attenuation;

cast a viewpoint ray to an object surface point, wherein the viewpoint ray comprises a ray extending from a user perspective within the three-dimensional model casting a reflection ray of the viewpoint ray;

identify an intersection point between the reflection ray and the map, wherein the intersection point comprises a particular gradient value based upon at least one of the two or more specular intensity gradients that is determined at least in part by the particular reflective surface type;

calculate the specular reflection of the object surface point based on the intersection point between the reflection ray and the map, wherein the specular effect is calculated at least in part based upon the particular gradient value; and display the map that comprises the representation of the at least one light source within the three-dimensional model.

* * * * *